June 7, 1966   J. H. HALSEY   3,254,921
RECOVERING MERCURY FROM SUBSURFACE ORE DEPOSITS
Filed June 14, 1963

JONATHAN H. HALSEY
INVENTOR.

BY Emil J. Bednar
ATTORNEY

United States Patent Office 3,254,921
Patented June 7, 1966

3,254,921
RECOVERING MERCURY FROM SUBSURFACE ORE DEPOSITS
Jonathan H. Halsey, Irving, Tex., assignor to Socony Mobil Oil Company, Inc., a corporation of New York
Filed June 14, 1963, Ser. No. 287,920
10 Claims. (Cl. 299—2)

This invention relates to a method for recovering mercury from subsurface ore deposits. More particularly, it relates to a method for recovering mercury by in situ heating of subsurface ore deposits.

Vast amounts of mercury are presently used in commerce. The metal is produced from various mercury-containing ores. The mercury-containing ores are extracted from subsurface ore deposits by conventional mining procedures. After being brought to the earth's surface, the mercury-containing ores are heated in the presence of air to produce the mercury metal. There are vast deposits of mercury-containing ores in the United States. However, these deposits cannot be exploited by conventional mining techniques to compete at present with the mercury produced in foreign countries. One reason is that the mercury-containing ores in the United States usually contain mercury in amounts insufficient to defray the costs of mining, transporting, and roasting the ores. Further, there are many subsurface ore deposits which have already been partially or completely mined but which now are abandoned because of economic or other reasons. Large amounts of mercury-containing ores yet remain in the ore deposits penetrated by such mines, generally in the form of rubble and exposed surfaces such as the mines' walls, floors, and roofs.

Several of the ore deposits in the United States which contain mercury also contain small amounts of carbonaceous materials. It would be desirable to use these small amounts of carbonaceous materials as a source of heat energy for producing mercury from the mercury-containing ores.

It is therefore an object of this invention to provide an economical method for recovering mercury from subsurface ore deposits. A further object is to recover mercury from previously mined subsurface ore deposits, which mines now are abandoned. Yet another object is to provide an efficient method for recovering mercury by in situ heating of subsurface ore deposits. Another further object is to provide a method utilizing any naturally occurring carbonaceous matreial in recovering mercury from subsurface ore deposits. Another further object is to provide a carbonaceous material in a subsurface ore deposit as fuel for producing mercury by in situ heating.

These and other objects and advantages will become more apparent when read in conjunction with the following detailed description of this invention, the appended claims, and the attached drawings wherein:

The objects of the present invention are achieved by a method in which a subsurface ore deposit is subjected to in situ heating to release the innate mercury. During heating, a gas may be injected from a heating source for sweeping the released mercury toward a remote recovery point. By maintaining a pressure differential between the heating source and the recovery point, controlling the amount of heat applied to the subsurface ore deposit and the amount of sweeping gas, the released mercury is maintained predominantly as a vapor and rapidly moved toward the recovery point. At the recovery point, the released mercury is recovered and subsequently condensed at the earth's surface into liquid mercury metal.

Figure 1:
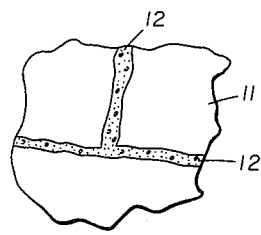
FIGURE 1 is a section of a typical mercury-containing ore.

Referring now to the drawings, a preferred illustrative embodiment of the present invention will be described. In FIGURE 1 there is shown a mercury-containing ore 11 which may be, for example, cinnabar. The ore 11 usually contains a plurality of small, interconnected, mineral-filled fractures 12. The fractures 12 may also contain carbonaceous materials, for example, hydrocarbons. The ore 11 may contain sufficient carbonaceous material to provide a part of the fuel for in situ heating. Thus, a valuable source of fuel for the method of this invention may be contained in certain of the ore deposits previously mentioned. Further, the small, mineral-filled fractures 12 may provide a large permeability in the mercury-containing ore 11.

Figure 2:
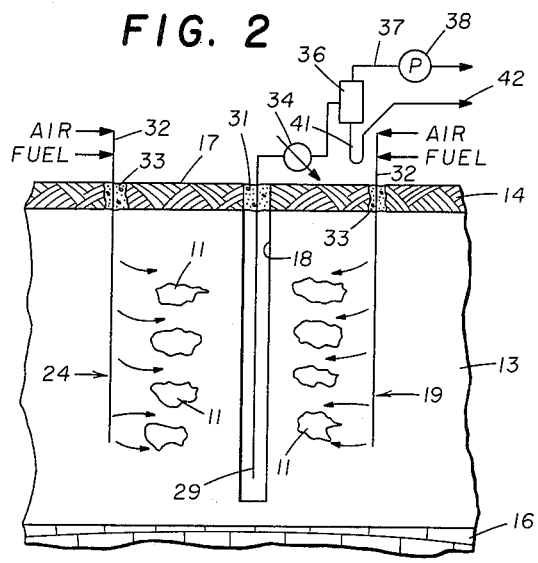
FIGURE 2 is a vertical section through the earth illustrating the application of the present invention to a subsurface ore deposit.

Referring now to FIGURE 2, the method of this invention will be described in its advantageous adaptation to the inherent properties of the mercury-containing ore 11 shown in FIGURE 1. The mercury-containing ore 11 is contained dispersed within a general subsurface ore deposit 13 which is covered by an impervious overburden 14 and supported by an impervious substrata 16. Although the ore 11 has been shown as being in isolated pods, it is apparent that in some cases it may be uniformly distributed in discrete units generally throughout the ore deposit 13.

Figure 3:
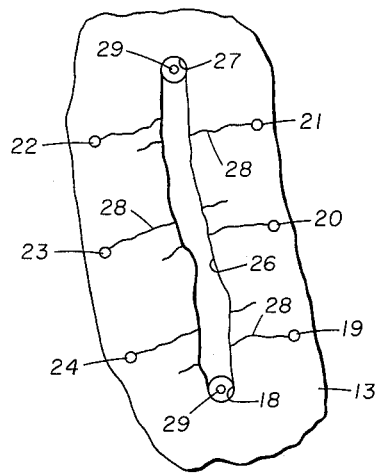
FIGURE 3 is a horizontal section taken medially through the structure of FIGURE 2.

As the first step in the method, a plurality of means for fluid communication from the earth's surface 17 into the ore deposit 13 are provided. Further, these means are fluidly interconnected through the ore deposit 13 by natural permeability. Specifically, there is provided a mine shaft 18 penetrating the ore deposit 13 substantially throughout its vertical extent. However, a well may be used instead of a mine shaft, if desired. A plurality of wells 19 through 24 are spaced about the mine shaft 18. Generally, the mine shaft 18 may be in existence as a portion of an abandoned mine, or it may be provided. In many cases the mine shaft 18 will have a tunnel 26 interconnected therewith, as is shown in FIGURE 3. Further, there may be one or more additional mine shafts 27 connecting with such tunnel 26 from the earth's surface 17. There may also be natural fractures 28 existing in the ore deposit 13. The natural fractures 28 may have been determined from examination of the tunnel 26, or by other means. Although not essential to the operation of this method, it is preferred that the wells 19 through 24 be spaced about the mine shafts 18 and 27 and the tunnel 26, in communication with the natural fractures 28. By this means, excellent fluid communication can be obtained between the wells 19 through 24 through the ore deposit 13 with the tunnel 26 and mine shafts 18 and 27. It is envisioned that in some situations it may be desirable to fracture the ore deposit 13 artificially to increase the natural permeability.

The mine shafts 18 and 27 are each provided with a conduit 29 adapted to provide fluid communication with the earth's surface 17. The conduit 29 is fluidly sealed at the overburden 14 by means of a packer 31 which, for example, may be concrete. The wells 19 through 24 are each provided with a conduit 32 which is sealed at the overburden 14 by means of a packer 33 which, for example, may be concrete. A plurality of perforations (not shown) are provided in the conduits 29 and 32 for fluidly interconnecting the conduits 29 and 32 with the ore deposit 13. Further, each of the additional mine shafts 27 may be provided with a conduit 29 and overburden seal similar to that of the mine shaft 18 previously described.

The conduits 32 positioned in the wells 19 through 24 are provided with a means at the earth's surface 17 for injecting a heat-creating fluid into the ore deposit 13. Usually, the heat-creating fluid will be provided from a source of air and a source of fuel at the earth's surface 17, which sources are not shown to avoid encumbering the present description. Suitable sources of air and fuel to provide a heat-creating fluid adapted to be burned in the ore deposit 13 will be obvious to those skilled in the art.

As the next step, a heat-creating fluid is introduced through conduits 32. The term "heat-creating fluid" is used herein to include a fluid selected from the group consisting broadly of air and fuel in proportions suitable for combustion. More particularly, it consists of oxygen-containing gases singly or in various proportions and combinations with combustible and non-combustible fluids and gases. The heat-creating fluid may be preheated initially at the earth's surface 17 by suitable equipment (not shown) to a temperature sufficient to ignite spontaneously in ore deposit 13 or to ignite a portion of any of the hydrocarbon materials in the ore deposit 13, if desired. Other means to ignite the heat-creating fluid may be used, if desired. Generally, the heat-creating fluid must generate sufficient heat by combustion in the wells 19 through 24, and the ore deposit 13 adjacent the wells, to heat the ore deposit 13 between the wells 19 through 24 and the mine shafts 18 and 27 and tunnel 26 to a suitable temperature to release the contained mercury. Generally, the fuel contained in the heat-creating fluid will be used independently of natural fuels to produce the desired amount of heat to decompose the mercury-containing ore in the ore deposit 13. The heating begins with the ore deposit 13 adjacent each of the wells 19 through 24 where initial burning occurs and progresses therethrough to the mine shafts 18 and 27 and tunnel 26. The combustion products of the fuel also assist in the driving of the released mercury through the ore deposit 13. Although it is desirable to inject the heat-creating gas into all of the wells 19 through 24, it is obvious that some of the wells 19 through 24 need not be used. For this purpose, any unused wells may be sealed or shut in.

The heat-creating fluid may also provide a gas for sweeping the mercury away from the wells 19 through 24 toward the mine shafts 18 and 27 and tunnel 26. For example, an excess of air is required to decompose the mercury-containing ores to produce the mercury metal. Thus, the heat-creating fluid may contain the excess air as the gas for sweeping the mercury away from the wells 19 through 24 and toward the mine shafts 18 and 27 and tunnel 26. However, it will be apparent that other gaseous materials may be used for sweeping the mercury away from the wells 19 through 24. For example, steam may be used for this purpose.

As the next step of this invention, a pressure differential is maintained between the wells 19 through 24 and the mine shafts 18 and 27 and tunnel 26. The purpose of such pressure differential is to establish a force sufficient to cause the mercury to flow from the wells 19 through 24 into the mine shafts 18 and 27 and tunnel 26. This assures a large recovery of the mercury released from the ore deposit 13. Various means for creating such a pressure differential may be used. For example, the conduit 29 in the mine shafts 18 and 27 may be provided with a vapor-handling system which is operated at a reduced pressure. More specifically, connected to the conduit 29 is a cooler 34 to liquefy mercury vapors coming from the mine shafts 18 and 27. The liquid mercury passes to a separator 36, providing a nonmercurial and gaseous, overhead vapor stream 37 and a liquid portion. The overhead vapor stream 37 exits the separator 36 through a connected high volumetric capacity suction pump 38. The liquid portion, including the mercury metal, is collected in the separator 36, then passed through a liquid seal 41 to a storage system (not shown) via conduit 42. The liquid seal 41 may comprise a U-tube assembly in the nature of a barometric leg which is kept filled with liquid mercury. By this means, the mine shafts 18 and 27 and tunnel 26 may be maintained at a much reduced pressure compared to the conduits 32 used for injecting the heat-creating fluid into the ore deposit 13. Other means of maintaining a reduced pressure between the area where the heat-creating fluid is injected into the ore deposit 13 and the area where the released mercury is recoved may be used, if desired.

The next step in the present method is the controlling of the heat applied to the ore deposit 13 by the heat-creating fluid, the amount of the sweeping gas, and the pressure differential between the wells 19 through 24 and the mine shafts 18 and 27 and tunnel 26 to maintain the substantial portion of the released mercury as a vapor while moving it to conduit 29. It will be obvious that no specific ranges of pressure, volumetric rates of sweeping gas, and magnitude of pressure differential may be recited because of the astonishingly broad variance in the conditions encountered in the ore deposit 13 itself. More particularly, it will be apparent that controlling these factors will be a matter of pragmatic eclectic empiricism. This step is of relative great advantage in the present invention in that this arrangement of factors maintains most if not all of the released mercury as a vapor moving at a high space velocity to an area for its recovery. Thus, the released mercury has a very high mobility in the ore deposit 13. Also, it will be apparent that, because of the much greater density of liquid mercury, collecting and recovering mercury as a vapor possess many advantages. For example, removing mercury as a liquid from mine shafts 18 and 27 and tunnel 26 would require a very powerful liquid pump. However, it is obvious that the mercury as a vapor can be readily recovered by a high volumetric pump 38 having a low power requirement. Further, the use of a sweeping gas is of great assistance in preventing any mercury from collecting into a liquid pool by causing it to revaporize and also to form fine globules which can be transmitted in a physical state resembling a vapor more than a liquid.

The next step is that of recovering the released mercury from the mine shafts 18 and 27. This step has been described conjunction with the previous step. However, any system for recovering the released mercury as the vapor or liquid from the mine shafts 18 and 27 and tunnel 26 may be used, if desired.

Similarly, the last step of condensing of the recovered mercury vapor into a liquid at the earth's surface 17 has also been described. It will be apparent that when the mercury is recovered as a vapor, the cooler 34 must have a rather large capacity to condense the mercury vapor from the large amounts of other gases applied or created from the heat-creating fluid and sweeping gas. Although one system has been shown that is well suited for this purpose, it will be obvious to those skilled in the art various other systems may also be used.

Figure 5:
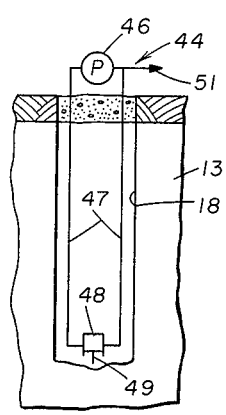
FIGURE 5 illustrates an apparatus used to collect liquid mercury from a position remote in the earth.

For example, where a portion of the released mercury is liquid, it will be necessary to provide a suitable means for its recovery. One such means for recovering liquid mercury is to increase the temperature of the surrounding ore deposit 13 progressively to an amount sufficient to vaporize the liquid mercury collected in the lower extremities of the mine shafts 18 and 27 and tunnel 26, and at other places. Additionally, or as an alternative, it may be desirable to provide a pumping system for moving the liquid mercury to the earth's surface 17. As previously stated, the problem of moving liquid mercury is rather severe even in its simplest form. However, in accordance with the present invention, a suitable means, as shown in FIGURE 5, is provided for efficiently recovering liquid mercury. Within the mine shaft 18 or 27 is disposed a jet pumping system 44 wherein a pump 46 for moving liquid mercury is shown connected in a closed pumping circuit 47 to a venturi jet 48 having a suction conduit 49 extending into the lowermost portions of the mine shaft 18 or 27, or tunnel 26. A controlled by-pass conduit 51 from the pump 46 is provided to remove a portion of the liquid mercury contained in the closed pumping circuit 47. By this means, the problem of requiring large-capacity, high-powered pumps to move a single column of liquid mercury is avoided in the jet pumping system 44 using balanced legs of mercury. The only power requirement is that required to lift a small additional amount of mercury collected from the bottom of the mine shaft 18 or 27, or tunnel 26, and to overcome the resistance in circulating the mercury retained in the pumping circuit 47.

Figure 4:
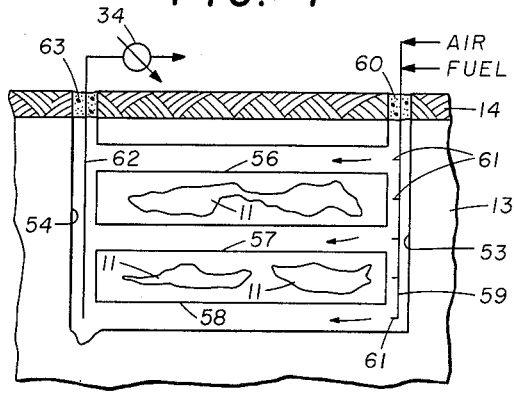
FIGURE 4 is a vertical section taken through the earth subject to an application of the present invention to an abandoned mine.

As an additional step in the present method of this invention, it may be desirable in some instances to introduce supplemental fuel directly into the ore deposit 13. For example, a liquid hydrocarbon may be introduced through the conduits 32 in the wells 19 through 24 before or in conjunction with the heat-creating fluid. For example, the liquid hydrocarbon may be diesel oil or residual oils. The excess air in the heat-creating gas will in situ combust such fluids to provide an additional source of heat in the ore deposit 13. Additionally, if desired, the liquid hydrocarbon may be introduced in such quantities prior to introducing the heat-creating fluid so as to saturate the ore deposit 13 extending between the wells 19 through 24 and mine shafts 18 and 27 and tunnel 26. Under these circumstances, the heat-creating fluid may be used to ignite the hydrocarbon-containing ore deposit 13 adjacent the wells 19 through 24. Subsequently, it is necessary to provide only sufficient air for a direct in situ burning to heat the ore deposit 13. The resultant flame front from in situ burning will traverse the ore deposit 13 between the wells 19 through 24 and mine shafts 18 and 27 and tunnel 26. Obviously, other combinations of using fuels and air will be apparent to those skilled in the art.

Where a mine is available, it may be desirable to modify the above-described method to provide an efficient mercury recovery system. With reference to FIGURE 4, there is shown a mine produced by conventional mining and abandoned, or otherwise, in an ore deposit 13. There are provided in the mine a plurality of mine shafts 53 and 54 and interconnected tunnels 56, 57, and 58. The exposed rubble, walls, floors, and roofs of the mine contain mercury in sufficient quantities to warrant recovery but not such that it can be recovered by conventional mining. The mine shaft 53 is provided with a conduit 59 for injecting the heat-creating fluid into one extremity of the mine. The conduit 59 is adapted to receive the injection of air and fuel, as previously described, and is sealed to the overburden 14 by a packer 60, which may be concrete. The conduit 59 may be provided with a plurality of side openings 61 whereby the heat-creating fluid may be uniformly distributed along extended surfaces of the mine shaft 53 and connecting tunnels 56, 57, and 58. A mine shaft 54 at the other extremity of the mine is provided with a conduit 62 connected to a mercury recovery system, the same or equivalent, as is shown in FIGURE 2, for recovering mercury vapor. The conduit 62 is sealed to the overburden 14 by a packer 63. The heat-creating fluid is introduced through the conduit 59 into the mine shaft 53 to heat the ore deposit 13 of the mine exposed to the mine shafts 53 and 54 and tunnels 56, 57, and 58. The ore deposit 13 exposed to the heat-creating fluid is heated principally by conduction rather than by convection as previously described with reference to FIGURES 2 and 3. If desired, any, or all of the mine shafts 53 and 54, and tunnels 56, 57, and 58, may be loaded with a carbonaceous fuel to assist in producing the desired magnitude of heat required to recover the mercury by convection heating. For example, the carbonaceous fuel may be coal or liquid hydrocarbons such as diesel oil or residual oils. The use of a liquid hydrocarbon for in situ burning type heating in accordance with the priorly described embodiment may also be found desirable in some cases to provide the heating required to release the mercury from the ore deposit 13. Furthermore, the hot nonmercurial gases passing out of shaft 54 may be introduced into shaft 53 to provide additional heating and to act as a sweeping gas. The remaining steps of the priorly described embodiment are followed in recovering and condensing the mercury from the abandoned mine shown in FIGURE 4.

Although it will be apparent that the present invention has been described specifically to the recovery of mercury from ore deposits previously mined, it is apparent that it may be extended to recovering mercury from deposits which are virgin.

It will be apparent from the foregoing that there has been herein provided a method well suited to satisfy all of the stated objects of the present invention. Further, the present invention may be embodied in other specific forms without departing from the spirit or essential attributes thereof. Furthermore, the present embodiment is to be considered in all respects as illustrative and not restrictive, as is in fact clear in several matters from the description itself. Reference is to be had to the appended claims to indicate those principles of the invention exemplified by the particular embodiment described.

What is claimed is:
1. A method for recovering mercury from a subsurface ore deposit comprising:
 (a) providing a plurality of means for fluid communication from the earth's surface to the ore deposit, said means being fluidly interconnected through the ore deposit;
 (b) introducing a heat-creating fluid through a first of said means to heat the ore deposit sufficiently to release the contained mercury;
 (c) providing a gas for sweeping the mercury away from the first of said means;
 (d) maintaining a pressure differential between the first of said means and a second of said means sufficient to flow the mercury to the second of said means;
 (e) controlling the heat applied to the ore deposit by the heat-creating fluid, the amount of sweeping gas, and the pressure differential between the first and second of said means to maintain the substantial portion of the released mercury as a vapor;
 (f) recovering the released mercury from the second of said means; and
 (g) condensing the recovered mercury vapor into a liquid.

2. The method of claim 1 wherein the plurality of means for fluid communication are disposed along natural fractures whereby these fractures provide for fluidly interconnecting the means through the ore deposit.

3. The method of claim 1 wherein a liquid hydrocarbon is introduced into at least part of the ore deposit via the first of said means to provide an in situ fuel to produce heat in conjunction with the heat-creating fluid.

4. A method for recovering mercury from a subsurface ore deposit penetrated by at least one mine shaft and tunnel interconnected therewith comprising:
 (a) providing a plurality of wells from the earth's surface into the ore deposit, said wells spaced about the mine shaft and tunnel;
 (b) introducing a heat-creating fluid through the wells to heat the ore deposit between the wells and the mine shaft and tunnel sufficiently to release the contained mercury;
 (c) providing a gas from the wells for sweeping the mercury away from the wells toward the mine shaft and tunnel;
 (d) maintaining a pressure differential between the wells and the mine shaft sufficient to flow the mercury to the mine shaft and tunnel;
 (e) controlling the heat applied to the ore deposit by the heat-creating fluid, the amount of sweeping gas, and the pressure differential between the wells and the mine shaft and tunnel to maintain the substantial portion of the released mercury as a vapor;
(f) recovering the released mercury from the mine shaft and tunnel; and
(g) condensing the recovered mercury vapor into a liquid at the earth's surface.

5. The method of claim 4 wherein the wells are disposed along natural fractures whereby these fractures provide for fluidly interconnecting the wells with the mine shaft and tunnel.

6. The method of claim 4 wherein a liquid hydrocarbon is introduced into at least part of the ore deposit via one or more of the wells to provide an in situ fuel to produce heat in conjunction with the heat-creating fluid.

7. A method for recovering mercury from the ore remaining in a mine after conventional mining of an ore deposit is abandoned comprising:
(a) introducing a heat-creating fluid through a first shaft of the abandoned mine to heat the ore deposit exposed by mining sufficiently to release the contained mercury;
(b) providing a gas for sweeping the mercury toward a second shaft of the abandoned mine remote from the first shaft;
(c) maintaining a pressure differential between the first and second shafts sufficient to flow the mercury to the second shaft;
(d) controlling the heat applied to the ore deposit by the heat-creating fluid, the amount of sweeping gas, and the pressure differential between the first and second shafts to maintain the substantial portion of the released mercury as a vapor;
(e) recovering the released mercury from the second shaft; and
(f) condensing the recovered mercury vapor into a liquid at the earth's surface.

8. The method of claim 7 wherein a carbonaceous fuel is introduced into at least a part of the abandoned mine to provide an in situ fuel to produce heat in conjunction with the heat-creating fluid.

9. The method of claim 8 wherein the carbonaceous fuel is a liquid hydrocarbon.

10. The method of claim 7 wherein at least a portion of the hot nonmercurial gases passing out of the second shaft are introduced into the first shaft as a sweeping gas.

References Cited by the Examiner

UNITED STATES PATENTS

| | | | |
|---|---|---|---|
| 849,524 | 4/1907 | Baker | 299—4 X |
| 1,759,456 | 5/1930 | Hofseth | 299—2 |
| 2,172,683 | 9/1939 | Reed | 299—4 |
| 2,481,051 | 9/1949 | Uren | 299—6 |
| 2,954,218 | 9/1960 | Dew et al. | 299—4 |

JACOB L. NACKENOFF, *Primary Examiner.*

E. R. PURSER, *Assistant Examiner.*